United States Patent [19]
Clark

[11] 4,280,712
[45] Jul. 28, 1981

[54] TRAILERS FOR HAULING LOGS AND THE LIKE AND ADAPTED FOR USE IN TANDEM

[76] Inventor: Randall N. Clark, P.O. Box 185, Union, Me. 04862

[21] Appl. No.: 25,837

[22] Filed: Apr. 2, 1979

[51] Int. Cl.³ .............................................. B62D 3/10
[52] U.S. Cl. .............................. 280/144; 280/414 R
[58] Field of Search ..................... 280/143, 144, 414 R

[56] References Cited

U.S. PATENT DOCUMENTS

| | | | |
|---|---|---|---|
| 943,495 | 12/1909 | Warren | 280/144 |
| 954,317 | 4/1910 | Martin | 280/144 |
| 1,260,489 | 3/1918 | Warner | 280/144 |
| 2,388,304 | 11/1945 | Ackerman | 280/144 |
| 2,671,670 | 3/1954 | Page | 280/144 |
| 2,827,304 | 3/1958 | Backus | 280/143 |
| 3,447,815 | 6/1969 | West | 280/143 |

Primary Examiner—Joseph F. Peters, Jr.
Assistant Examiner—John A. Carroll

[57] ABSTRACT

Trailers for use in hauling logs and adapted for use in tandem have fore and aft bunks each of which has a pair of horizontal members that are connected by a central pivot to the trailer and have vertical stakes at their outer ends. An air operated piston-cylinder unit is provided for each bunk with its rod connected by links to the members to enable them to be pivoted between a first position in which transversely aligned stakes are spaced apart a minimum distance to provide a minimum trailer width and a load-receiving position in which the distance between corresponding stakes is increased to establish a maximum trailer width.

14 Claims, 11 Drawing Figures

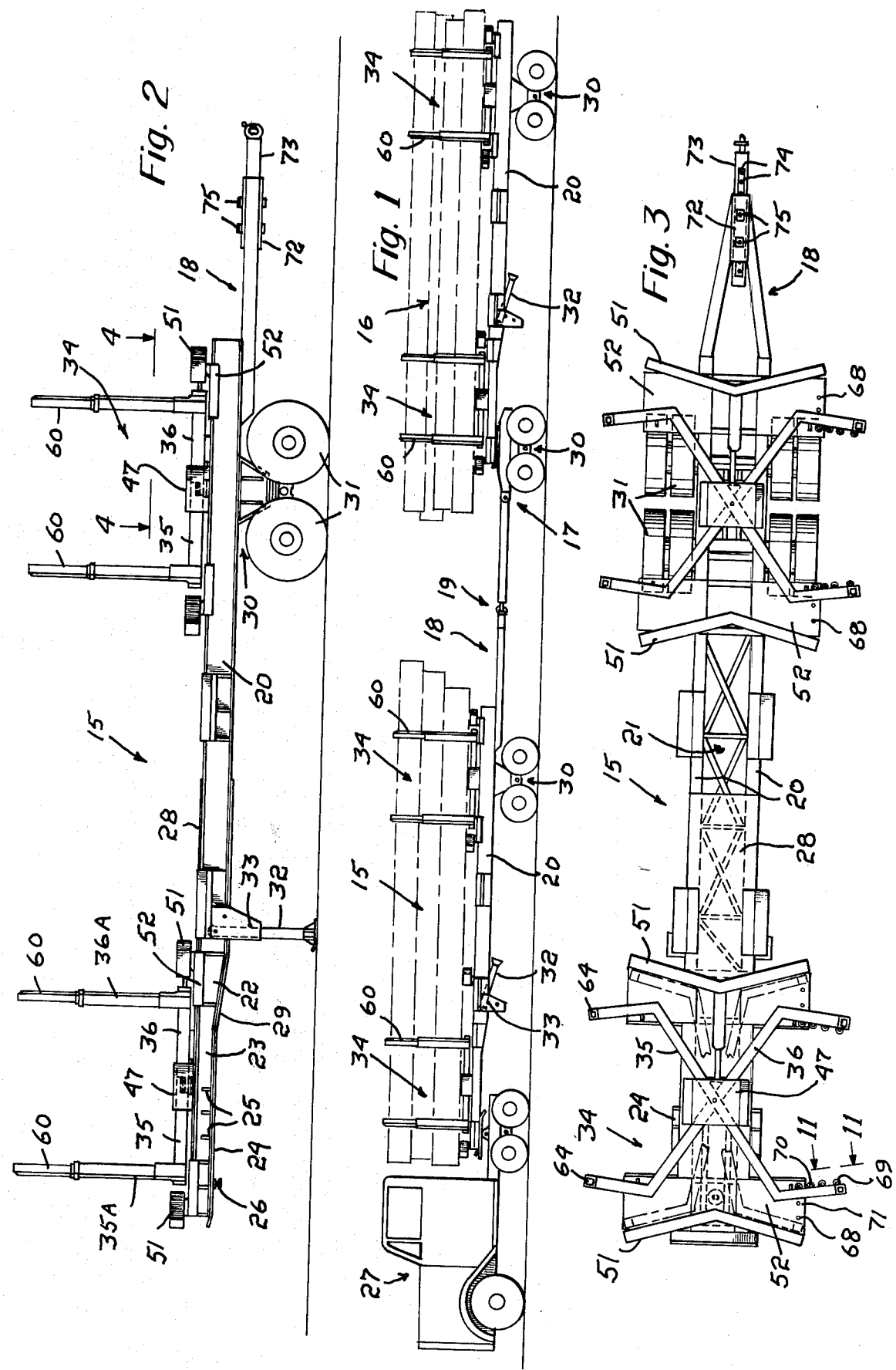

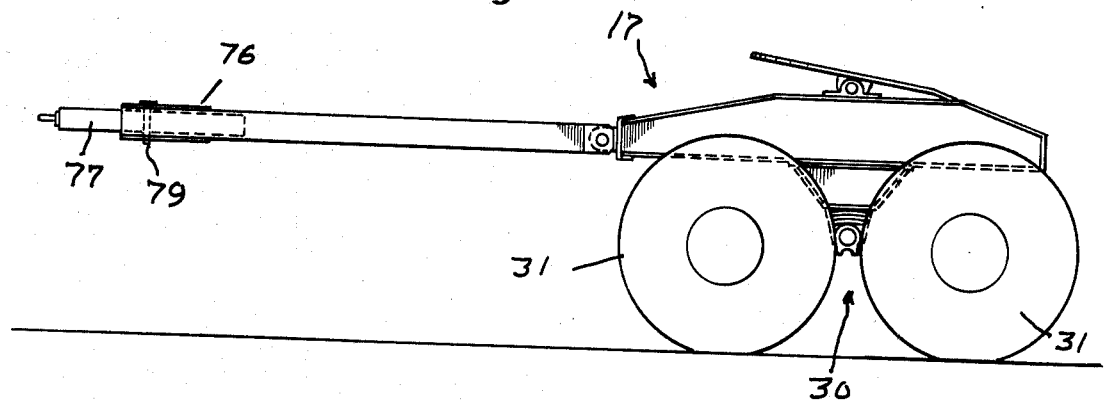
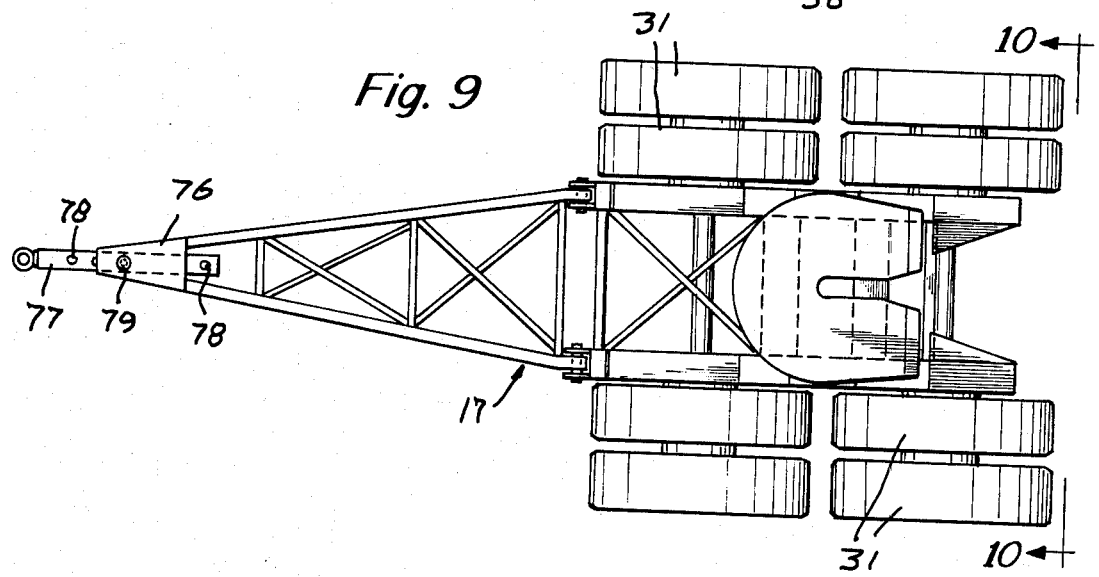
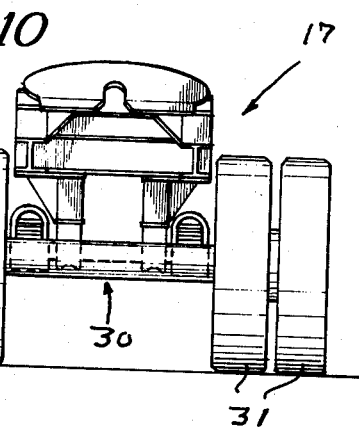
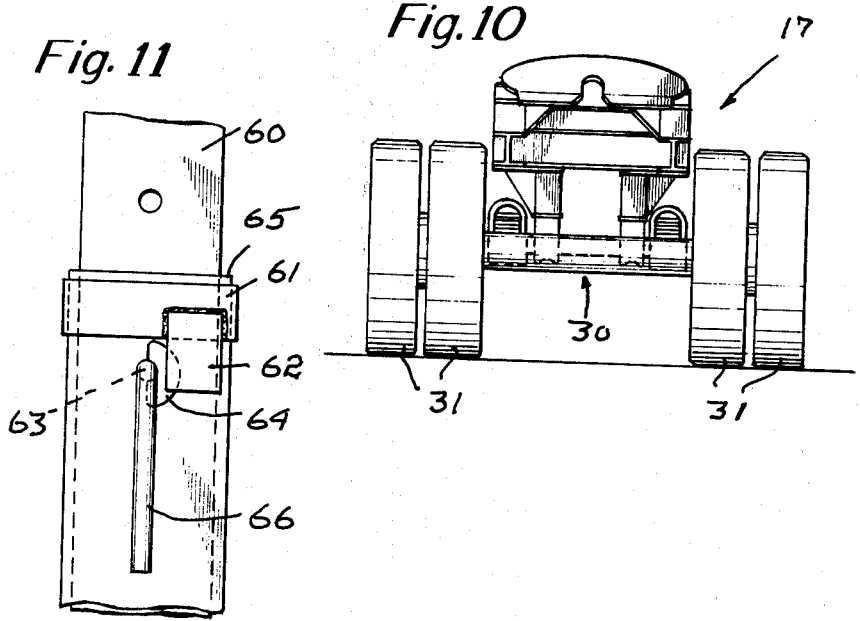

TRAILERS FOR HAULING LOGS AND THE LIKE AND ADAPTED FOR USE IN TANDEM

BACKGROUND REFERENCES

U.S. Pat. No. 943,495
U.S. Pat. No. 954,317
U.S. Pat. No. 1,260,489
U.S. Pat. No. 2,388,304
U.S. Pat. No. 2,671,670

BACKGROUND OF THE INVENTION

Where logs are hauled over privately owned roads from the harvesting site to a mill such as a paper mill, there are only practical limitations on the width and length of a load. One such limitation is the width of the road being used and this has lead to the use of trailers provided with log retaining bunks that could be extended laterally to position the stakes on each side to accommodate a maximum load width and retracted so that on a return trip to the harvesting site, the empty trailers would be of normal width thus enabling loaded and unloaded trailers to pass more easily than would be the case if the width of the bunks could not be reduced.

The usual, log hauling trailer has U-shaped, transverse bunk members the base or horizontal portions of which include telescopingly connected outer sections including vertical stakes thus to enable an operator manually to extend the bunk members to position their stakes into their wide load relationship or return them to their retracted unloaded relationship. The difficulty with such bunks has proved to be that sometimes the operators would not take the trouble to shorten the bunk members to reestablish the minimum width of the trailer and often, the heavy loads would so damage a bunk member as to make it impossible to effect bunk adjustments manually or so difficult so to do that the operators would leave the bunks in whichever condition they were, if the retracted condition, then a substantial reduction in the loads carried and if the expanded condition then an increased risk of accident.

As far as can be determined, bunks and other retaining means have never been provided with power operated means to effect their expansion to provide a wide load width of a trailer or retracted to reestablish a normal trailer width and as far as can be determined, bunks and like load retaining members have always moved along straight transverse lines or in like planes in all cases without varying the width of the vehicles.

THE PRESENT INVENTION

The general objective of the present invention is to provide bunk constructions that are adjustable by power operated means between wanted loaded and unloaded widths and that are well adapted to withstand the hard usage to which they are unavoidably subjected during loading and unloading operations.

In accordance with the invention, this general objective is attained with a trailer provided with the horizontal portions of bunk establishing members centrally pivoted to the trailer and with power operated means operable to turn them in one direction from their first position into second positions in which their outer ends and their vertical stake portions extend farther outwardly from the sides of the trailer to establish their load-receiving relationship or in the opposite direction into their first position to reestablish the unloaded width of the trailer.

As trailers in accordance with the invention may be and desirably are long enough to carry forty or fifty foot logs as well as shorter ones, it is desirable to use enough bunk establishing members to provide adjacent each end of the trailer two stake portions spaced lengthwise of each side, an important objective of the invention is to provide bunks adapted to meet that requirement. Each such bunk includes two horizontal bunk establishing members that are connected to the trailer between their ends by a common pivot with power operated means, preferably but not necessarily air operated, piston-cylinder units, connected to each member.

Another objective of the invention is to provide a bunk construction that enables the trailer frame to be relatively narrow but with the bunk establishing members adequately supported adjacent their ends, an objective attained with the frame provided with laterally projecting shoulder plates by which the members are supported, each member desirably but not necessarily having a plate-engaging shoe.

Another objective of the invention is to provide a bunk construction that enables the bunks to be so dimensioned that they do not interfere with the use of loading and unloading equipment and also prevent the weight of a load from being borne entirely by the pivotally interconnected bunk members. This objective is attained with each of the pivotally interconnected bunk members having outer end portions disposed in opposite directions and defining an obtuse angle with the intermediate portion of that member with substantial lengths of the angle-defining portions always supported by a shoulder. Each bunk also includes at least one and desirably two stationary bunk members serving as stops against which the angularly disposed end portions of the members rest when the bunk is fully retracted and disposed to share with the pivotable bunk members in the support of the load.

Yet another objective of the invention is to ensure that the movable bunk establishing members of each bunk may be turned easily in opposite directions by the power operated means, an objective attained with bearing plates secured to the proximate faces of the movable members and to the lower face of the lower member and a bottom supporting plate. Each bearing plate has a central portion providing a circular bearing surface the diameter of which is greater than the width of the movable members and a layer of anti-friction material is between each two bearing plates.

Other objectives, novel features and advantages of the invention will be apparent from the following specification and appended claims.

BRIEF DESCRIPTION OF THE DRAWINGS

The accompanying drawings illustrate a preferred embodiment of the invention and FIG. 1 is a side view of tandem connected trailers in accordance therewith;

FIG. 2 is a side view of the lead trailer on an increase in scale;

FIG. 3 is a plan view thereof;

FIG. 8 is a side view of the dolly;

FIG. 9 is a plan view thereof;

FIG. 10 is a rear view of the dolly; and

FIG. 11 is a view taken approximately along the indicated line 11—11 of FIG. 3.

THE PREFERRED EMBODIMENT OF THE INVENTION

Figure 4:
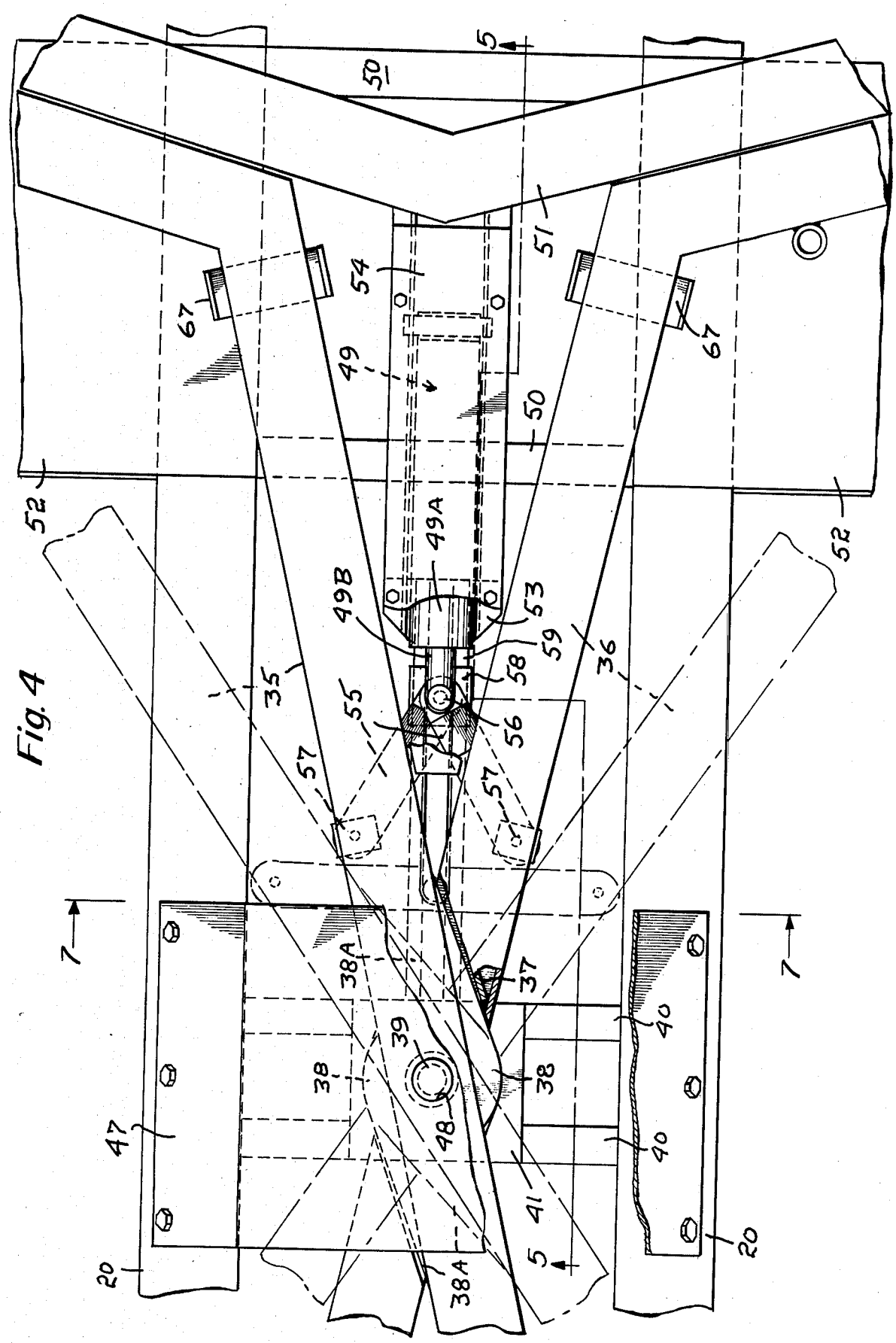
FIG. 4 is a section, on a substantial increase in scale, taken approximately along the indicated line 4—4 of FIG. 2.

While trailers in accordance with the invention are not necessarily of the type to be used in tandem, advantages exist in trailers that can be so used. Among such advantages are better weight distribution on the roads, greater total load weight per trip and, if desired, a greater load weight per trailer.

FIG. 1 shows a lead trailer 15 and a trailer 16 which is supported by a dolly, generally indicated at 17, see also FIGS. 8-10. The dolly 17 is connected to a stinger, generally indicated at 18 at the rear of the trailer 15 by any suitable coupling 19. With the exception of the stinger 18 and the dolly 17, the trailers 15 and 16 are or may be identical.

The frame of each trailer has two lengthwise I-beams 20 interconnected by centrally located cross bracing, generally indicated at 21, see FIG. 3. The forward end of each beam 20 is connected by a tapered section 22, see FIG. 2, and an I-beam 23 the height of which is less than that of the beams 20 thus establishing the front end of each trailer as somewhat of a goose neck. A plate 24 welded to the bottom flanges of the beams 23 is provided with gussets 25 welded to its laterally protruding margins and to the beams 23 has a depending pivot 26 enabling the forward end of the trailer 15 to be connected in a conventional manner to the fifth wheel of a tractor 27 or, in the case of the trailer 16, to that of the dolly 17. The upper and lower surfaces of the framework in and for a short distance rearwardly of the goose neck have reinforcing plates 28 and 29 welded thereto.

The trailer frames have spring suspension units generally indicated at 30 adjacent its rear end and of a type having front and rear dual wheels 31 and the dolly 17 has a like unit. When a trailer is not in use, its front end is held by stands 32 pivotally connected to the frame of the trailer with each held in that position by a locking pin 33 or held thereby in an inoperative position when a trailer is connected to the tractor or the dolly.

Figure 5:
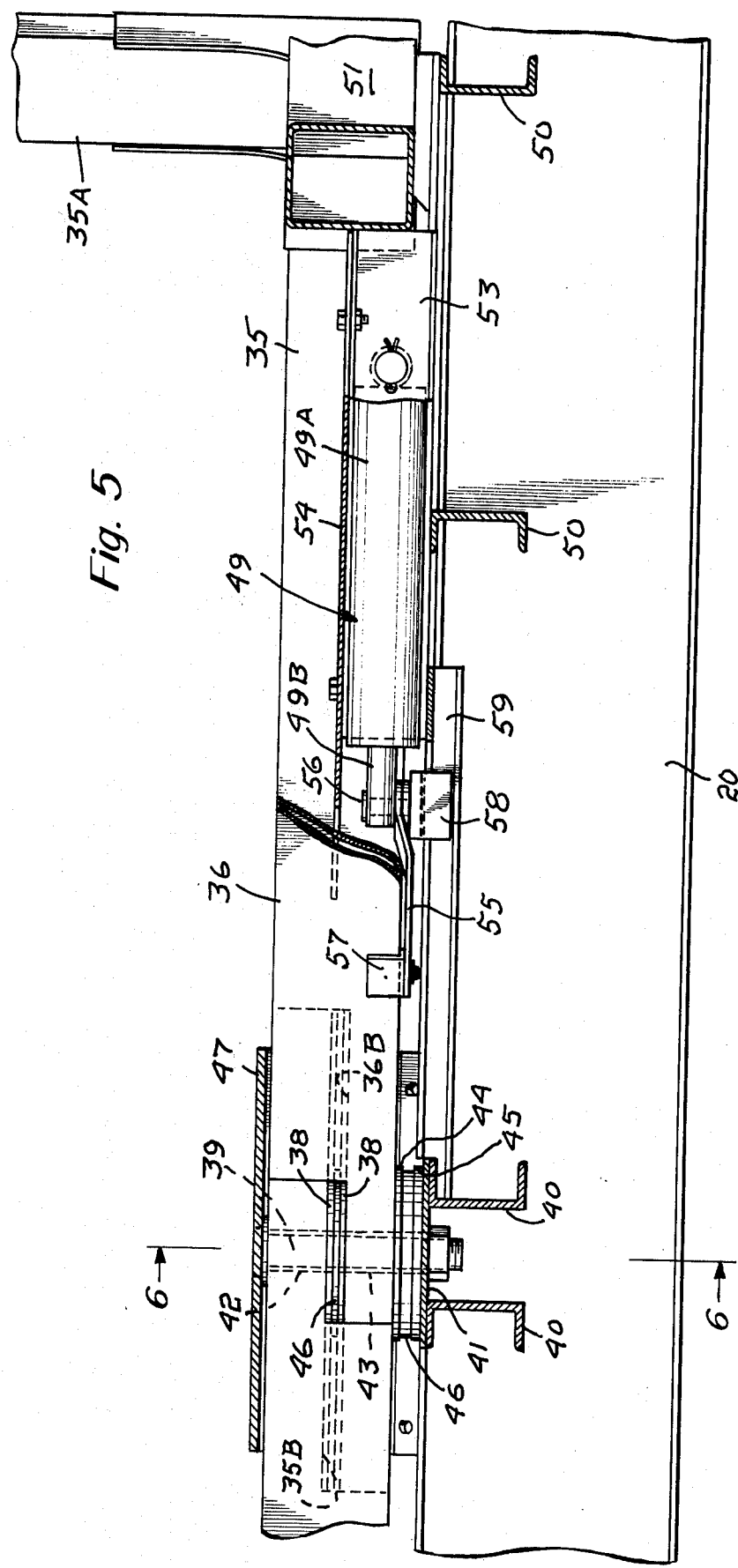
FIG. 5 is a section taken approximately along the indicated line 5—5 of FIG. 4.

Each trailer has log bunks, one adjacent end and each generally indicated at 34. Each bunk has crossed, horizontal bunk members 35 and 36 that are pivotally interconnected with each member hollow and rectangular in cross section. The ends of the members 35 and 36 are provided with vertical stake portions 35A and 36A, respectively. The lower part of the central portion of the member 35, best seen in FIG. 5, is cut away as at 35B and the upper part of the central portion of the member 36 is cut away as at 36B thus to enable the members 35 and 36 of each bunk to be assembled with their upper, load receiving surfaces in the same plane. The cut away areas are of sufficient length to enable the crossed members to be pivoted relative to each other to a wanted extent. Each member is closed at each end of its cut away area by a reinforcement 37 and a bearing plate 38 is welded in each such area. Each bearing plate 38 is shaped and dimensioned to provide a circular portion, the diameter of which is equal to the length of the cut away area and thus protrudes from each side of the bunk member to which it is welded, and portions 38A each welded to an opposite side of that member.

For the pivotal interconnection of the bunk members 35 and 36 and their connection to the trailer by a pivot pin 39, the frame beams 20 are interconnected by channels 40 in support of a plate 41. The bearing plate 33 of each member 35 has a pin-receiving bushing 42 welded thereto and to that bunk member. The bearing plate 38 of each bunk member 36 has a pin-receiving bushing 43 welded thereto to that bunk member and to a lower bearing plate 44. Between the bearing plate 38 and between the bearing plate 44 and a bottom bearing plate 45 there are bearings 46 each of which, in practice, is a polyethylene sheet. A protective plate 47 attached to the frame members 20 overlies the central portions of the members 35 and 36 and has a central port 48 receiving the upper end of the pivot 39.

Each bunk is provided with power operated means to effect the pivoting of the arms 35 and 36 between a first position in which there is a minimum distance between the transversely aligned stake portions 35A and 36A and a second position in which, for load receiving purposes, the distance between said stake portions is increased to a predetermined maximum. In the illustrated embodiment of the invention, the power means for each bunk 34 is an air operated, piston cylinder unit 49.

At each end of each bunk, the frame beams 20 are interconnected by a pair of spaced channel members 50 the upper flanges of which are parallel to but above the beams 20 in support of a fixed transverse bunk member 51 and laterally projecting shoulder plates 52 which establish the maximum, unloaded width of the trailers. The fixed bunk members 51 share with the members 35 and 36 in support of the load and are shown as extending the full width of the trailer as established by the shoulder plates 51.

Figure 7:
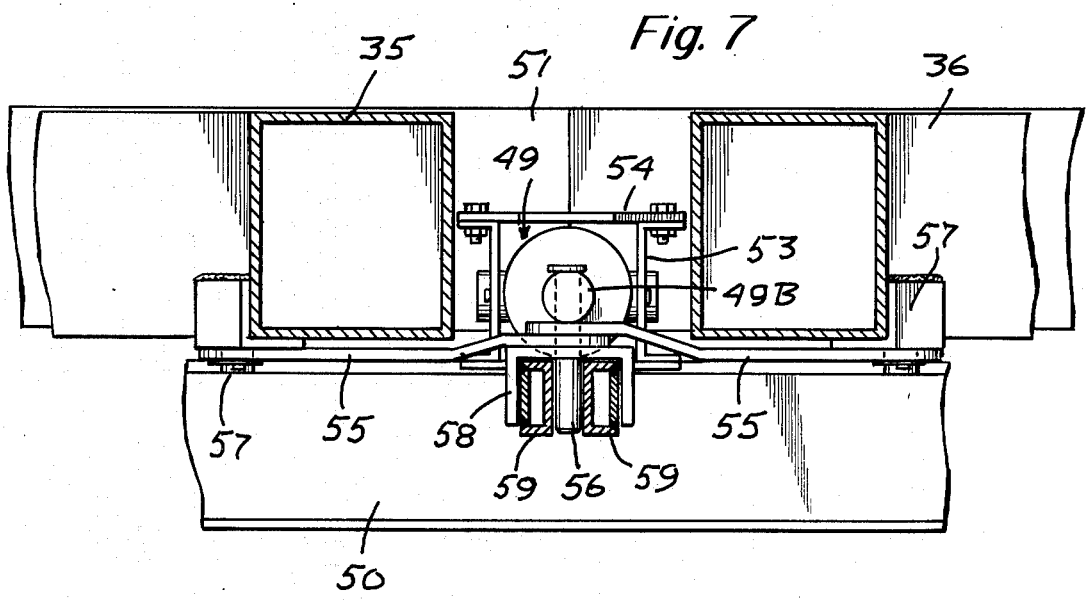
FIG. 7 is a section taken approximately along the indicated line 7—7 of FIG. 4.

A U-shaped support 53 is provided for each unit 49 and is mounted on one of the channel members 50 with an end abutting the proximate fixed bunk member 51. The cylinder 49A of each unit 49 is within and pivotally connected to the support 52 which has a cover 54. The rod 49B of each unit 49 is connected to a pair of links 55 by a pivot 56. Each link 55 is pivotally connected as at 57 to an appropriate one of the bunk members 35, 36. The pivot 56, see FIG. 7, is provided with a downwardly opening U-shaped slide 58 straddling a pair of supports 59 spaced to receive between them the end of the pivot 56. The supports 59 are welded to the proximate channel 40 and to the support 53.

Turning again to the bunk members, it will be seen that each of the bunk members 35, 36 has parallel outer portions 35C, 36C extending in opposite directions and that the fixed bunk members 51 are in the form of shallow Vs engageable as stops by the portions 35C, 36C of the bunk members 35, 36 when in their first positions. It will also be noted that the stake portions 35A and 26A serve as sockets for upper stakes 60 which are also hollow and rectangular in cross section. The upper end of each stake portion 35A, 36A has, see FIG. 11, a reinforcing band 61 provided with a depending tab 62 along one side of which there are transversely aligned holes for a locking pin 63. The upper end of each upper stake is downwardly inclined towards the center line of the trailer and is closed by a reinforcing cap 64 and each upper stake 60 is provided with an encircling strap 65 serving as a stop. Each locking pin 63 has a retainer 64 projecting from one side in a position such that each pin 63 may be inserted, handle 66 up through the transversely aligned holes in the stake portions 35A and 35B and through corresponding holes in the upper stake 60 to connect that upper stake 60 to a lower stake portion and then turned 180°, the retainer 64 then caught in back of the tab 61 as one means of securing that pin 63.

Figure 6:
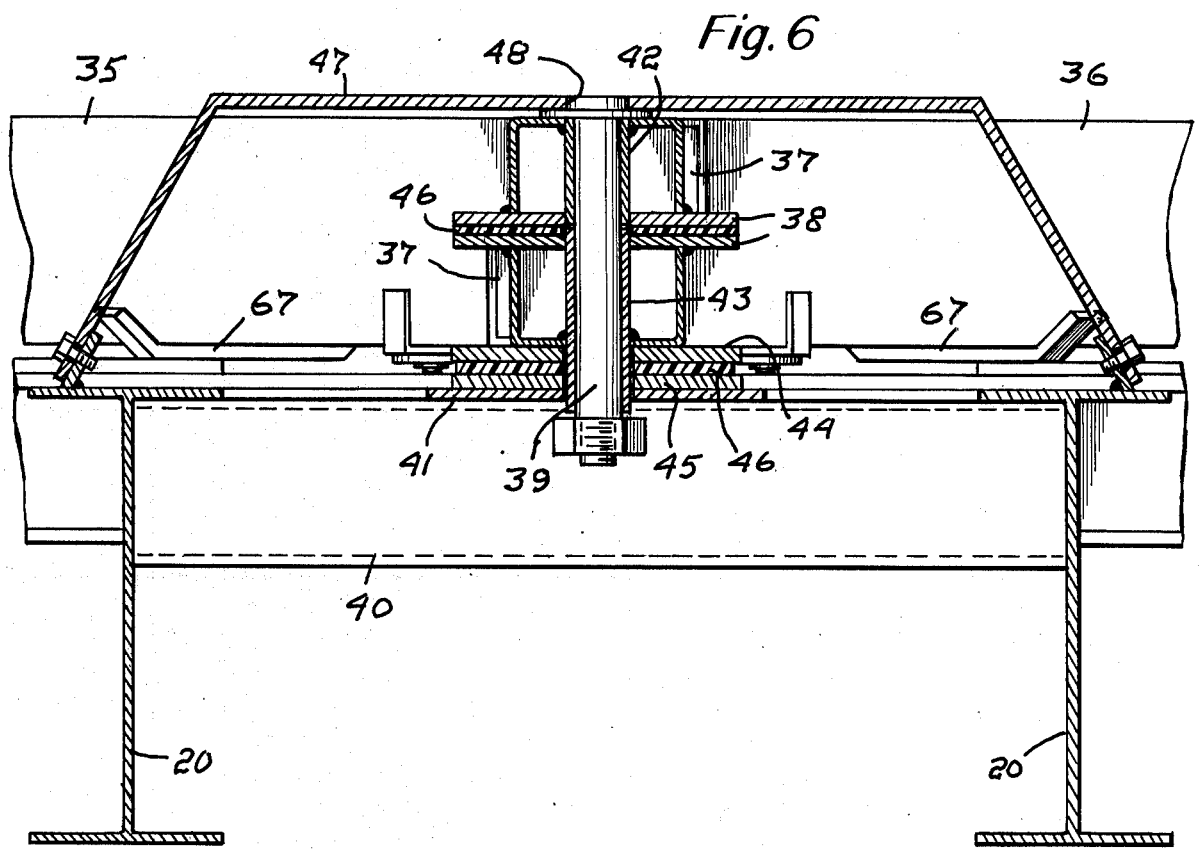
FIG. 6 is a section taken approximately along the indicated line 6—6 of FIG. 5.

The obtuse angular relationship between the outer ends 35C and 36C to the intermediate portions of the arms 35 and 36 is not critical other than in determining the wanted length of each bunk 34 and the space between them in order that loading and unloading equipment may grip logs between the bunks 34 or between the stakes of each bunk. In this connection, the narrowness of the trailer framework is a feature. It is preferred that, when the arms 35 and 36 are in their second positions, the outer ends 35C and 36C will be slightly "toed in" in order to provide the wanted overall length of each bunk of the trailers 10 and 11. Each member 35 and 36 is provided with a shoe 67, see FIGS. 4 and 6, in a position to be in engagement with the appropriate one of the shoulder plates 52 at all times.

While the members 35 and 36 cannot move once the bunks are loaded with the members 35 and 36 in their second position, they must be held when in their first position. To that end, see FIG. 3, the plates 52 at one side of the trailers are each provided with a hole 68 to receive the locking pin 69 held in a retainer 70 on one of the portions 35C of the member 35 of each bunk 34, see FIGS. 3 and 4. The trailers illustrated by the drawings provided a trailer width when the members 35 and 36 were in their first positions of 8'6" and a second position width of 12'2", load width 10'10". In order that the trailers could be tested where lesser load widths might be required, each of the shoulder plates 52 having the hole 68 also has other holes 71 and the portion 35C having the retainer 70 also provided with a series of other like retainers 70, one for each of the holes of the series 71 and providing a range of maximum trailer widths for such test uses.

The stinger 18, see FIGS. 2 and 3, is shown as having a holder 72 at its rear end for a slide 73 provided with one of the members of the coupling 19. The slide 73 has a lengthwise series of holes 74 selected ones of which receive locking pins 75. The dolly 17, see FIGS. 8 and 9, also has a holder 76 for a slide 77 provided at its forward end with the other member of the coupling 19. The slide 77 also has a lengthwise series of holes 78, a selected one of which receives a locking pivot pin 79. The series of holes 74 and the series of holes 78 enable the distance between the coupling 19 and the trailer to be increased or decreased.

I claim:

1. A trailer for hauling logs and other long materials, said trailer includes a frame, at least one bunk including two bunk members, means pivotally connecting said members to said frame for movement in a horizontal plane, each member of a length greater than the maximum width of said trailer and including a stake at each of its ends, and means operable to pivot said members between first and second positions, in said first position, each stake spaced from the longitudinal center line of the trailer a distance not more than one-half of said maximum width and in said second position, each stake spaced a predetermined distance from said center line greater than said one-half of said maximum width thus to enable said trailer to accommodate a wider load than when said members are in their first positions, and shoulder plates extending outwardly from the sides of the frame, each shoulder plate in support of a substantial outer portion of a pivotable member when in said second position.

2. The trailer of claim 1 in which the shoulder plates establish the maximum width of the trailer and there are transverse bunk members fixed on said trailer, each shoulder plate also supporting a fixed bunk end.

3. The trailer of claim 1 in which the two members are crossed and the pivot means joins them at their centers, the upper, load receiving surfaces of the two members in the same plane.

4. The trailer of claim 1 in which there are two bunks, one adjacent each end of the trailer, said bunks so dimensioned that there is a substantial distance between them, the two members of each bunk are crossed, the pivot means joins them at their centers, the upper load receiving surfaces of the two members are in the same plane, and said shoulder plates which extend outwardly from each side of the frame are located at each end of each bunk.

5. The trailer of claim 4 and fixed transverse bunk members and disposed to share with the pivotable bunk members in the support of the load.

6. The trailer of claim 3 in which the fixed bunk members are supported by the shoulder plates.

7. The trailer of claim 6 in which each of the pivoted members includes oppositely extending outer portions defining an obtuse angle with the intermediate portions thereof, the fixed bunk members include portions against which said outer portions seat when the members are in their first position.

8. The trailer of claim 7 and manually operable stops connectable to two shoulder plates of each bunk to prevent the movement of said pivotable members away from the fixed members.

9. The trailer of claim 7 and manually operable stops connectable to two shoulder plates of each bunk to establish at least one second position of the pivotable members.

10. The trailer of claim 7 in which the width of the shoulder plates is such that their proximate edges do not protrude into the space bounded by the stakes.

11. The trailer of claim 3 in which the lower surface of one member and the upper surface of the other member have central complemental recesses of a length permitting the two members to be pivoted to a wanted extent, and the pivot means includes bearing plates secured in each recess and to the bottom surface of said other member, the frame includes a support, a base plate rests on said support, anti-friction sheets, one between the bearing plates in the recesses, and one between the base plate and the bearing plate in the bottom of said other member, a pivot extending through said member, plates and sheets, and bushings, one carried by the first named member, and the associated bearing plate and the other carried by the other member and the associated plates.

12. The trailer of claim 3 in which the stakes of the members are sockets and there are additional stakes, one for each socket and entrant therein and detachably connected thereto.

13. The trailer of claim 3 in which the means operable to pivot the crossed members includes a fluid pressure operated piston cylinder unit and links connecting the rod thereof to said members.

14. The trailer of claim 13 in which the rod carries a slide and a track carried by the frame underlies the path of said rod and supports said slide.

* * * * *